Oct. 12, 1965  W. J. MORLEY  3,211,111
MULTI-CHANNEL CARRIER CURRENT CONTROL SYSTEM
Filed Aug. 24, 1960  5 Sheets-Sheet 3
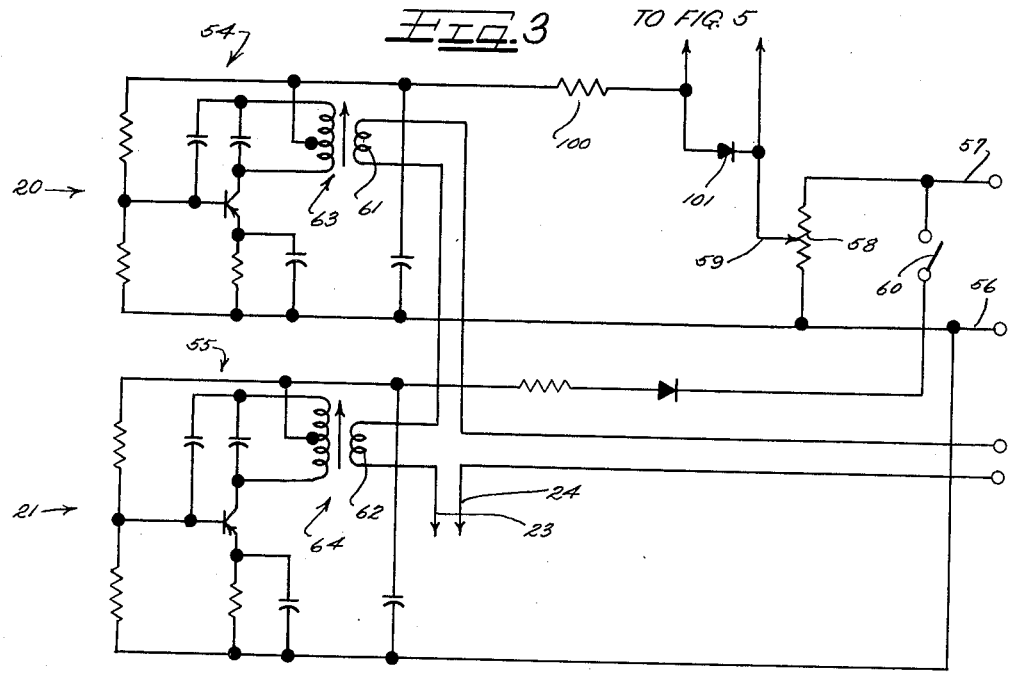
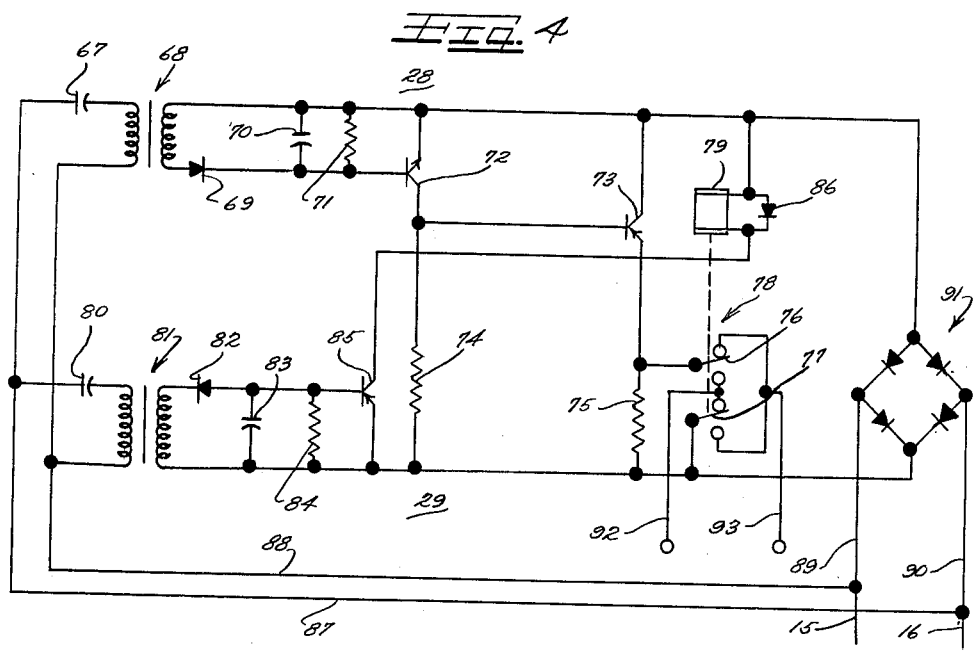
Inventor
WILLIAM J. MORLEY

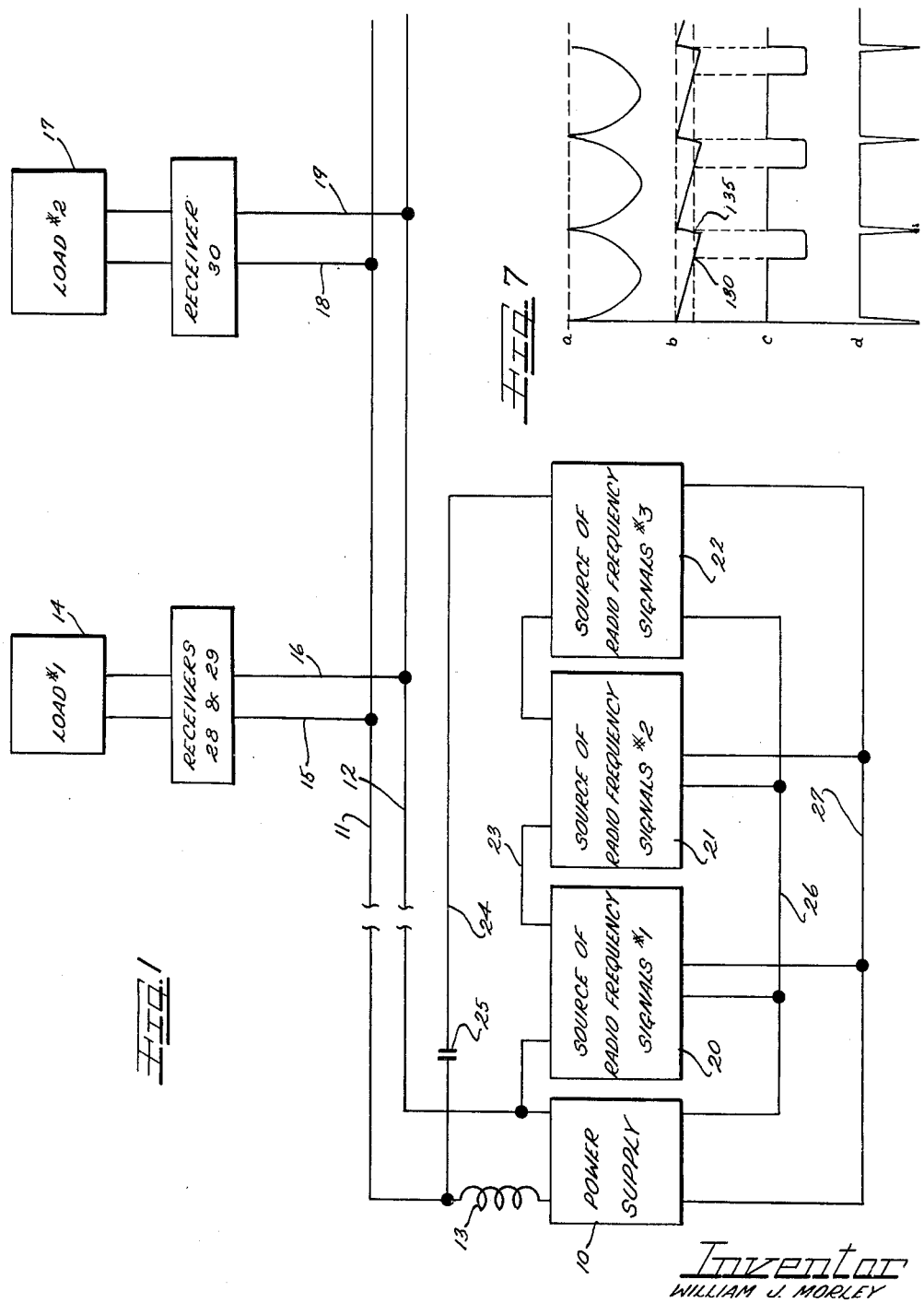

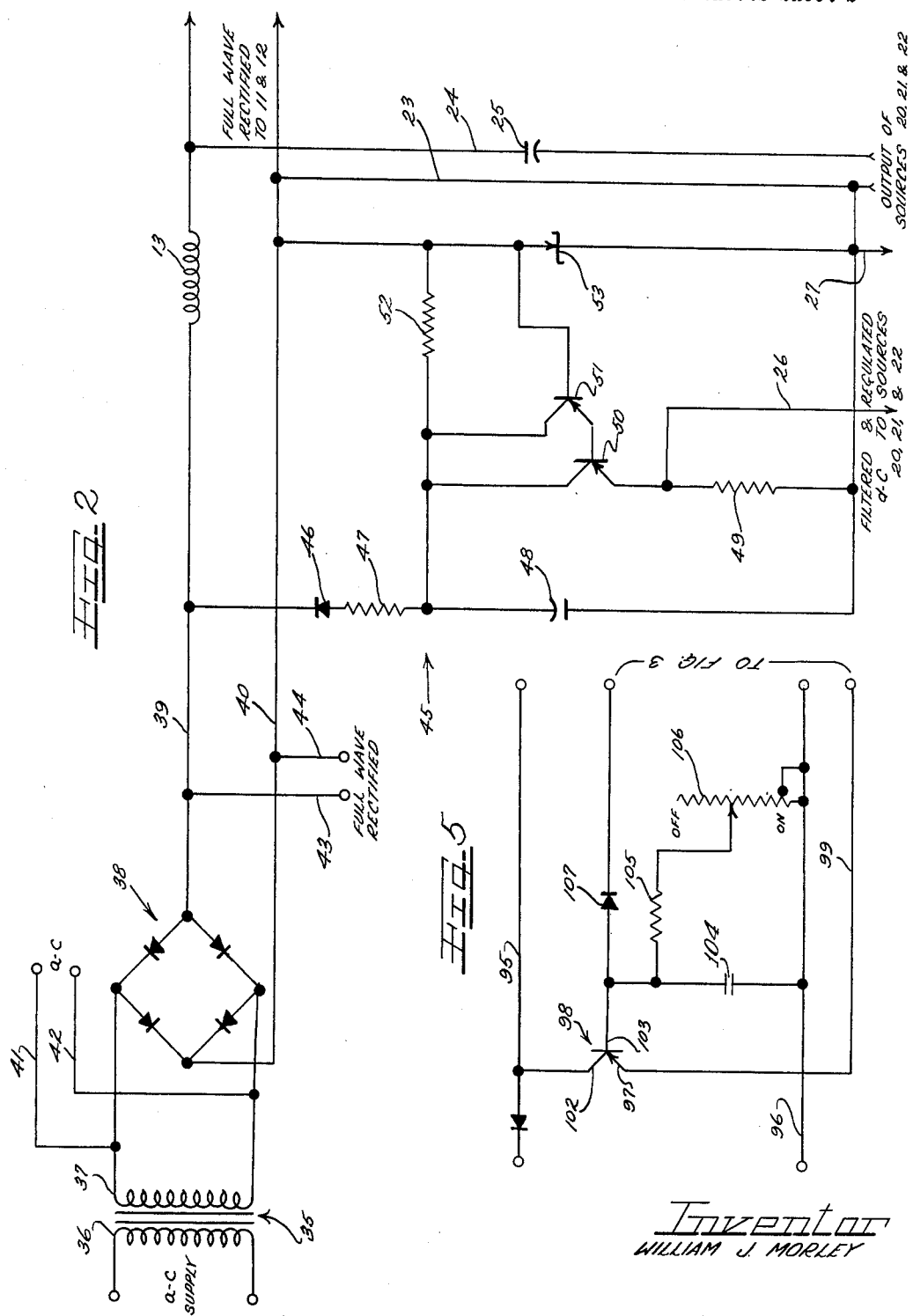

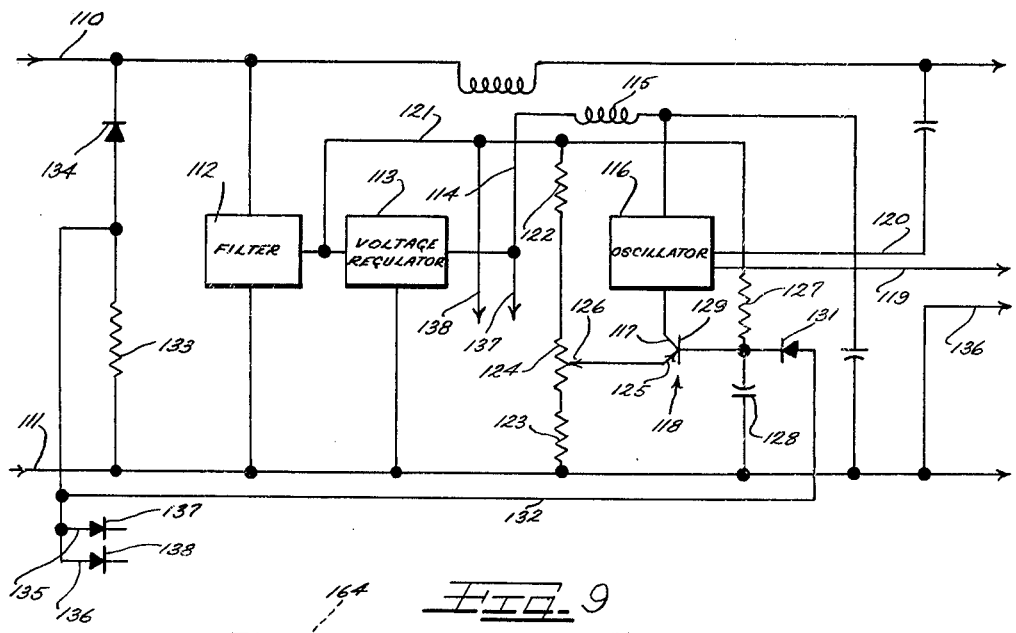
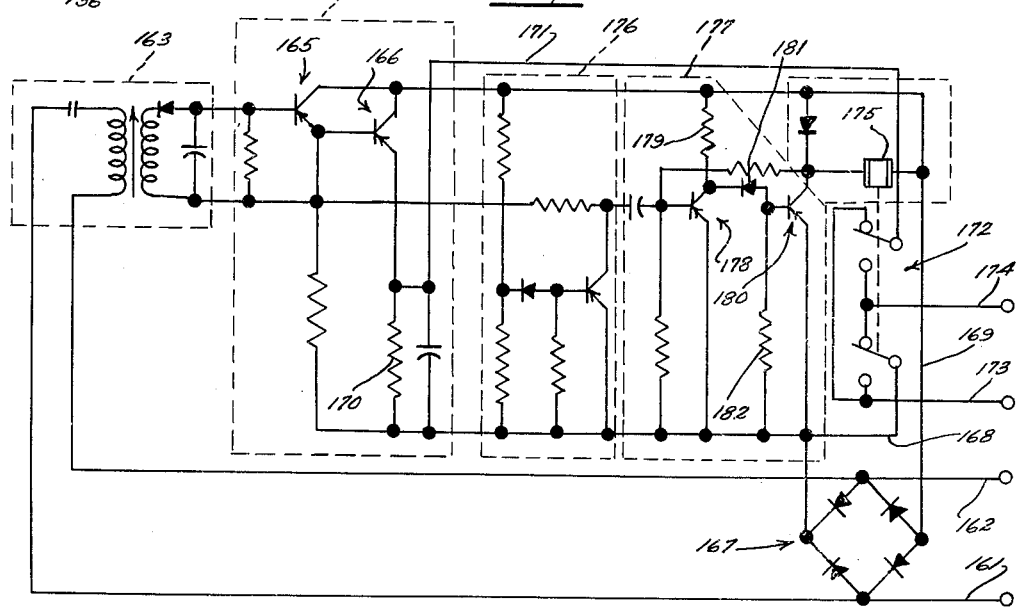

United States Patent Office 3,211,111
Patented Oct. 12, 1965

3,211,111
MULTI-CHANNEL CARRIER CURRENT
CONTROL SYSTEM
William J. Morley, 6505 W. 41st Ave.,
Wheatridge, Colo.
Filed Aug. 24, 1960, Ser. No. 51,572
2 Claims. (Cl. 104—149)

This invention relates to control systems and, more particularly, to a system which is particularly suited for simultaneously controlling the operation of a plurality of operations on a model railroad system.

One method that has been used to control the operation of a number of electrical loads that are connected to a common power transmission line is to send a radio-frequency signal along the transmission line along with the power-frequency energy. The operation of this type of system is usually such that the existence of the radio-frequency signal on the line actuates the load and the non-existence of this signal keeps the load turned off or in some other condition.

Such systems have in the past been deficient in the limited number of loads or functions that can be controlled. If more than one load is to be controlled, some sort of a switching operation has been required to connect different ones of the control signals and the loads to the transmission line in succession. Heretofore, attempts to control simultaneously a plurality of loads connected to receive power from a common power transmission line which also carries the control signals have necessitated the use of filtering networks of varying degrees of complexity.

According to the present invention there is provided a control system which simultaneously controls by means of radio frequency signals the operation of a number of loads which receive electrical power and the control signals over a common transmission line.

It is an object of this invention to provide a control system which is able to control simultaneously from a remote position the amount of power consumed by a plurality of loads and to vary the amount of power consumed by each load in an infinite number of steps.

It is still another object of this invention to provide a control system which is specially adapted for the control of model railroad systems and is able to control simultaneously the operation of a plurality of locomotives on a single track.

Other objects, features and advantages of the present invention will be apparent from the following detailed description taken in conjunction with the accompanying figures of the drawings, in which:

FIGURE 1 is a schematic illustration of a control system constructed in accordance with the invention;

FIGURE 2 is a schematic illustration of a power supply for the system illustrated in FIGURE 1;

FIGURE 3 is a schematic illustration of radio frequency signal sources constructed in accordance with one embodiment of the invention;

FIGURE 4 is a schematic illustration of radio frequency signal receivers adapted to be used with the sources shown in FIGURE 3;

FIGURE 5 is a schematic illustration of a brake and coast control circuit for the source shown in FIGURE 3;

FIGURE 6 is a schematic illustration of a radio frequency signal source constructed in accordance with another embodiment of the invention;

FIGURE 7 is a schedule of waveforms for the circuit shown in FIGURE 6;

FIGURE 9 is a schematic illustration of a radio frequency signal receiver adapted to be used with the sources illustrated in FIGURES 6 and 8;

Figure 8:
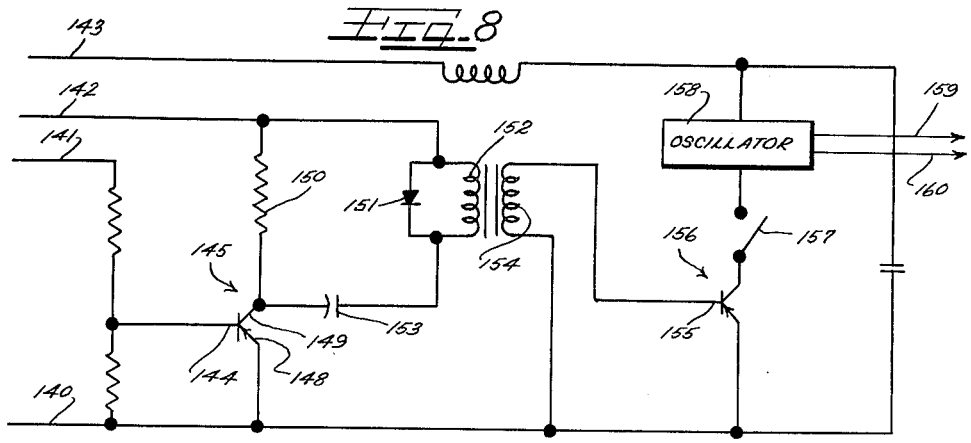
FIGURE 8 is a radio frequency signal source constructed in accordance with another embodiment of the invention.

While the system herein described can be employed to control numerous types of loads or functions, it is particularly suited to control the operation of a model railroad and will be described in that application.

As shown on the drawings:

The system illustrated in FIGURE 1 includes a power source 10 that is connected to a transmission line made up of two conductors 11 and 12 through a choke coil 13. The transmission line is also connected by two conductors 15 and 16 to a first load 14 through two receivers 28 and 29 and by two conductors 18 and 19 to a second load 17 through a receiver 30.

In order to control the application of power to the two loads 14 and 17, a control system is provided which includes, in the embodiment of the invention illustrated, three sources of radio-frequency signals 20, 21 and 22 which are also connected to the transmission line. The outputs of these three sources are connected in series to the conductors 11 and 12 by two conductors 23 and 24 and blocking capacitor 25. Two conductors 26 and 27 connect the power source 10 to the three sources 20, 21 and 22 and supply power for these three units. The three sources 20, 21 and 22 are designed to generate radio-frequency signals at different frequencies and the three receivers 29, 28 and 30, which are also connected to the conductors 11 and 12, are tuned to be responsive to different ones of these frequencies.

Briefly, the operation of the control system is as follows: When a load, such as the load 14, is to be turned on, the source 20 of radio frequency signals is energized and the signals are applied to the conductors 11 and 12 of the transmission line. The receiver 28 responds to these signals and operates a secondary circuit which connects the conductors 15 and 16 to the load 14. Likewise, when the source 21 of radio frequency signals is energized, a second radio frequency signal, at a frequency different from the first, is applied to the line and picked up by the receiver 29. This receiver also operates a secondary circuit which reverses the direction of current flow through the load 14.

In the event a second load, such as the load 17, is also connected to the line it can be actuated or otherwise controlled by energizing the source 22 of radio frequency signals which causes the receiver 30 to generate a voltage which actuates this load.

It can be seen that the outputs from the receivers 28, 29 and 30 are designed to cause the loads to which they are connected to perform different functions. Since the sources 20, 21 and 22 and the receivers 28, 29 and 30 are designed to operate at different frequencies they can be energized concurrently and all of the load functions operated simultaneously.

When a system of the type described herein is being used to control the operation of a model railroad, the conductors 11 and 12 are the two railroad tracks and the two loads 14 and 17 are two different locomotives. The power source 10 supplied power to the tracks 11 and 12 in order to drive the locomotives and perform other functions such as operating lights, whistles, uncoupling devices, sound effects, etc. The receivers 28, 29 and 30 are normally mounted in either the locomotive or a box car connected to the locomotive and are used to control the performance of these functinons. For example, the source 20 and receiver 28 can be used to connect power to the driving motor in the locomotive while the source 21 and the receiver 29 can be used to change the direction of current flow through the motor so that the train will travel in either a forward or a backward direction. The receiver 29 could also be used to operate decoupling devices, lights, sound effects, etc. as previously described. The load 17 could be any other load such as a switching device rather than another locomotive. It is obvious that numerous other functions could also be controlled simply by providing additional signal sources and receivers. Of course, means will have to be provided to prevent the numerous signals from interfering with each other, which may be accomplished by generating the signals at different frequencies.

The circuit illustrated in FIGURE 2 is transistorized power supply that can be used as the power supply 10. It includes a transformer 35 that has its primary winding 36 adapted to be connected to an A.-C. outlet and its secondary winding 37 connected to a bridge rectifier circuit 38 that produces a full wave rectifier voltage on conductors 39 and 40. An A.-C. output is also provided from the secondary side of the transformer 35 by two conductors 41 and 42. The full wave rectified voltage output from the rectifier circuit 38 is connected to two output conductors 43 and 44 and also to a filter and regulator circuit 45.

The circuit 45 includes a diode 46 which ensures that the wrong polarity voltage will not be applied to the transistors in this circuit, and a surge limiting resistor 47. The resitor 47 is connected to a capacitor 48, a resistor 49, two transistors 50 and 51 which are connected in emitter-follower type circuits, a resistor 52 and a Zener diode 53. The Zener diode 53, the resistor 52 and the transistor 51 provide a voltage reference for the base electrode of the transistor 50. The filtered and regulated output of this circuit is taken across the resistor 49 and fed to the radio frequency signal sources 20–22. The outputs from the signal sources are connected by way of conductors 23 and 24 to the conductors 39 and 40.

In FIGURE 3 is illustrated the two radio frequency signal sources 20 and 21. These two sources include two conventional radio frequency oscillators 54 and 55 which are supplied with a filtered and regulated D.-C. voltage over conductors 56 and 57. The oscillator 54 is designed to produce a radio frequency signal at a constant frequency and at an amplitude that is determined by the setting of the slider 59 on a variable resistor 58 which is connected across the power input conductors 56 and 57. The oscillator 55 is tuned to a frequency different than that of the oscillator 54 and is connected to the power input conductors 56 and 57 through an on-off switch 60. Whenever the switch 60 is closed, power is applied to the oscillator 55 which causes it to produce a constant amplitude radio frequency signal. Whenever the switch 60 is open of course the oscillator is inoperative and provides no output signal.

The output signals from the two oscillators are taken from the secondary windings 61 and 62 of their output transformers 63 and 64. The secondary windings of these and any other oscillators in the system are connected in series by means of the conductors 23 and 24 which lead to the transmission line. Consequently, as many radio frequency signals as there are sources are superposed on the same transmission line whenever all of the oscillators are operating. These radio frequency signals are carried by the conductors 11 and 12, along with the power frequency energy supplied by the power source 10 and are picked up by the receivers.

FIGURE 4 is a schematic diagram of the receivers 28 and 29 which are responsive to the signals generated by the oscillators 54 and 55 in the sources 20 and 21. These two receivers produce voltages which are indicative of variations in the amplitudes of these signals and are connected to control the load 14.

The receiver 28 includes standard detector circuit that has a capacitor 67, a transformer 68, a diode 69, and a capacitor 70 connected in parallel with the secondary winding of the transformer. The direct current output from this detector circuit is amplified by two transistor amplifier circuits that include a resistor 71, an NPN transistor 72, a PNP transistor 73 and two resistors 74 and 75. The amplified output is taken across the resistor 75 which is connected to the movable blades 76 and 77 of a double-pole double-throw switch 78. The position of the switch blades 76 and 77 is determined by a relay winding 79 which is connected to be energized whenever the receiver 29 picks up signals. Radio frequency signals from the oscillator 55 in the source 21 are detected by a detector circuit which includes a capacitor 80, a transformer 81, a diode 82 and a capacitor 83. The rectified output from this detector is amplified by a circuit that includes a resistor 84 and a PNP transistor 85. The collector electrode of this transistor 85 is connected to parallel combination of the relay winding 79 and a diode 86.

The radio frequency signals and the power to drive the load are fed into this circuit by two conductors 15 and 16 which are connected to the transmission line. The signals are fed to the inputs of the receivers 28 and 29 by two conductors 87 and 88 which are connected to the primary windings of the transformers 68 and 81. The power frequency energy is connected by two conductors 89 and 90 to a bridge rectifier circuit 91.

Assume that the source 20 of radio frequency signals is energized and the variable resistor 58 is set to produce a maximum amplitude signal. This radio frequency signal is picked up by the receiver 28 which causes the transistor 73 to conduct. When this transistor is conducting, current flows along the path defined by the bridge rectifier circuit 91, the resistor 75, the transistor 73, and back to the rectifier circuit 91. The voltage drop across the resistor 75 causes current to also flow through the blade 77 of the switch 78 to the load 14 which is connected to two conductors 92 and 93, back to the blade 76 of the switch 78 and to the other side of the resistor 75. If the load 14 is a model locomotive, the conductors 92 and 93 are connected to energize the windings of a direct current motor in the locomotive that drives the train. The bridge rectifier circuit 91 is provided so that the correct polarity voltage will be applied to the transistors regardless of the connections of the conductors 15 and 16 to the track. This permits the train to be placed on the tracks facing in either direction without danger of damage to the transistors.

When it is desired to reverse the direction of travel of the train, the source 21 of radio frequency signals is energized by closing the switch 60 that connected the power line to the oscillator circuit 55. This causes radio frequency signals at the frequency of the oscillator circuit 55 to be applied to the conductors 11 and 12 of the transmission line and picked up by the receiver 29. The presence of these signals causes the transistor 85 to conduct and current to flow through the relay winding 79. The position of the double-pole double-throw switch 78 is then reversed so that current flows through the locomotive motor winding in the opposite direction and causes the train to reverse its direction of travel.

When the operation of model railroad is being controlled by this system, it is sometimes desirable to have a circuit which will simulate the coasting and braking operation of a real train. Such a circuit is illustrated in FIGURE 5 and is adapted to be connected to the source 20 of radio frequency signals illustrated in FIGURE 3. This coasting and braking circuit includes two conductors 95 and 96 which are connected to the conductors 57 and 56, respectively, which, it will be recalled, are connected to a filtered and regulated D.-C. supply voltage. The emitter electrode 97 of a transistor 98 is connected by a conductor 99 between the resistor 100 and the diode 101 in FIGURE 3 and the collector electrode 102 is connected to the conductor 95. The base electrode 103 of this transistor is connected to the parallel combination of a capacitor 104 and a variable resistance that includes a fixed resistor 105 and a variable resistor 106. The base electrode 103 of this transistor is also connected through a diode 107 to the slider 59 of the variable resistor 58 in FIGURE 3.

Assuming that the slider on the resistor 58 is initially at the maximum power position, power will be applied to the oscillator circuit 54 and the capacitor 104 will be charged as current flows along the path defined by the conductor 96, the capacitor 104, the diode 107, the slider 59 on the resistor 58, and the conductor 57. The magnitude of the charge on this capacitor 104 will be determined by the setting of the variable resistor 58. If the resistor 58 is suddenly turned from the maximum power position to the off position, there will no longer be a voltage applied across the capacitor 104 and it will begin to discharge through the variable resistor 106 and bias the transistor 98 to conduction. Current then flows from conductor 56, through the oscillator circuit 54, the resistor 100, the conductor 99, through the emitter 97 and collector 102 electrodes of the transistor 98, and to the conductor 95. The magnitude of the current flowing along this path will gradually lessen as the charge on the capacitor 104 is dissipated in the variable resistor 106 and the amplitude of the radio frequency signals gradually decreases to zero.

In the embodiment of the invention just described the load is controlled by modulating the amplitude of the radio frequency signals. It will be apparent that other types of modulation can also be used and the circuits shown in FIGURES 6, 8 and 9 illustrate an embodiment of the invention wherein the radio frequency signals are pulse-width modulated.

FIGURE 6 illustrates a source of radio frequency variable width pulses which includes two conductors 110 and 111 which are connected to receive the full wave rectified voltage appearing on conductors 43 and 44 in FIGURE 2. This voltage is filtered by a circuit 112 which has its output connected to a regulator circuit 113. The regulated voltage is connected by a conductor 114 through a choke coil 115 to a conventional oscillator. The other side of the oscillator 116 is connected to the collector electrode 117 of a transistor 118 and its output connected to two conductors 119 and 120. A conductor 121 is connected to the output of the filter circuit 112 and to a voltage divider network that includes two fixed resistors 122 and 123 and a variable resistor 124. The emitter electrode 125 of the transistor 118 is connected to the slider 126 on the variable resistor 124 and the base electrode 129 of this transistor is connected through a resistor 127 to the conductor 121 and through a capacitor 128 to the conductor 111.

The setting of the slider 126 on the variable resistor 124 is such that the transistor 118 is normally back biased below cut-off so that the oscillator 116 is not energized. With reference to FIGURE 7, the capacitor 128, which is attached to the base electrode 129 of the transistor 118, charges up as current flows through the capacitor 128 and the resistor 127 to the conductor 121. The circuit components are chosen so that the charge on this capacitor is essentially a straight line variation with time as illustrated by waveform b. When the charge on the capacitor reaches the point 130 the back bias on the transistor 118 is overcome and this transistor begins to conduct. Current then flows through the oscillator 116 and a radio frequency signal, the envelope width of which is represented by waveform c appears on the output conductors 119 and 120. As this capacitor charges an increasingly negative voltage is applied to the cathode of a diode 131. This diode is prevented from conducting, however, because a voltage represented by waveform a is applied to its anode over conductor 132. Therefore, the capacitor 128 continues to charge up until its voltage is equal to the declining waveform a. As soon as the capacitor 128 voltage is greater than this voltage, it begins to discharge through the diode 131, the conductor 132, and a resistor 133 which is connected in series with a diode 134 across the input conductors 110 and 111. When the charge on the capacitor 128 decreases to the point 135 on waveform b, the transistor 118 is again back biased below cut-off and the oscillator 116 is no longer energized. Since the envelope of the radio frequency signal, waveform c, is equal to the conducting time of the transistor 118, its width can be varied by adjusting the setting of the slider 126 on the variable resistor 124 which sets the back bias on the transistor 118.

The output of the oscillator 116 in each variable pulse width source can be connected in series with the others by two conductors 119 and 136. The other sources can also be connected to receive power from this circuit by way of conductor 137 which is connected to the regulated voltage output and conductor 138 which is connected to the filtered voltage output. The full wave rectified voltage which appears on the anode of the diode 131 can also be connected to a plurality of other sources by means of conductors 135 and 136 and diodes 137 and 138.

The circuit shown in FIGURE 8 can be used in conjunction with the variable pulse width source shown in FIGURE 6. When turned on this circuit provides a train of sharp pulses at the same frequency as the circuit shown in FIGURE 6, and it can be used to control a simple on-off function. The power applied to the circuit shown in FIGURE 8 includes a full wave rectified voltage which is applied across conductors 140 and 141, a rectified and filtered voltage which is applied across conductors 140 and 142, and a filtered and regulated voltage which is applied across conductors 140 and 143. The full wave rectified voltage is applied to the base electrode 144 of a transistor 145 which is connected to a voltage divider network that consists of two resistors 146 and 147 that are connected between the two conductors 140 and 141. The emitter electrode 148 of this transistor 145 is connected to the conductor 140, and its collector electrode 149 is connected to the conductor 142 through a resistor 150 and also to a parallel diode 151 and winding 152 combination through a capacitor 153.

When zero voltage is applied to the base electrode 144 at the beginning of each half cycle, the transistor 145 is normally non-conducting. As the full wave rectified voltage increases in a negative direction, the transistor begins to conduct and current flows from the conductor 140, through the transistor 145 and the resistor 150 to the conductor 142. This causes a voltage drop across the winding 152 and current flows through this winding momentarily until the capacitor 153 becomes charged. The primary winding 153 and the diode 151 act as a tank circuit for one direction of voltage oscillation but the diode 151 cuts off the reverse half-cycle and prevents further oscillation of this tank circuit. The build up of current in the winding 152 induces a voltage in the secondary winding 154 of the transformer which is applied to the base electrode 155 of a second transistor 156.

The sharp negative going pulse applied to the base electrode 155 of the transistor 156 turns on this transistor and causes current to flow from the conductor 140, through the transistor 156, an on-off switch 157, a radio frequency oscillator 158 which is tuned to the same frequency as the oscillator 116 in FIGURE 6, and to the conductor 143. The output conductors 159 and 160 of the oscillator 158 are connected in series with the conductors 119 and 136 of the oscillator 116 shown in FIGURE 6 and all other oscillators in the system.

The envelope of the radio frequency waves from the oscillator 158 in FIGURE 8 forms a sharp pulse and is represented by the waveform d in FIGURE 7. Since it occurs at the same frequency as the pulses from the oscillator 116 in FIGURE 6, it can be considered as being superposed on the waveform c. Therefore, the combined waveform is a sharp pulse at the beginning of every half-cycle followed by a variable width pulse. When the two circuits shown in FIGURES 6 and 8 are being used together, the variable resistor 124 in FIGURE 6, which controls the width of the pulse output from this circuit, may be constructed with a stop member so that the width of the pulse cannot be made larger than a predetermined amount. By this construction a short time interval is reserved at the beginning of every half-cycle for the pulse output from the circuit of FIGURE 8.

The receiver circuit shown in FIGURE 9 is adapted to be responsive to both of the circuits shown in FIGURES 6 and 8. The two conductors 161 and 162 are connected to the transmission line and receive both the power frequency and the radio frequency signals. The power frequency energy passes through a bridge rectifier circuit 167 to two conductors 168 and 169. The radio frequency control signals are picked up by a conventional detector circuit 163 of the type previously described which provides a voltage output that is amplified by a conventional two-stage amplifier circuit 164 that includes the two transistors 165 and 166. A variable width radio frequency signal picked up by the detector causes the transistor 166 to conduct and current to flow between the conductors 168 and 169 through the transistor 166 and a resistor 170. Current also flows along a conductor 171 which leads to a double-pull double-throw switch 172, to the output conductors 173 and 174 which lead to a load (not shown) and the conductor 168. It can be seen that the width of the incoming pulses determines the amount of energy delivered to the load.

The double-pull double-throw switch 172 is normally in the position shown in FIGURE 9 and will be switched to its other position in order to reverse the direction of current flow through the load, only when a relay winding 175 for the switch is energized. This relay is energized by the existence of a train of the sharp pulses generated by the circuit shown in FIGURE 8. A voltage due to a pulse of this type passes through a gate circuit 176 to a flip-flop circuit 177 which is connected to energize the relay winding 175. The flip-flop circuit 177 includes a transistor 178 that is connected in series with a resistor 179 across the two conductors 168 and 169. Since the two conductors 168 and 169 are connected to the output of the bridge rectifier circuit 167, a full wave rectified voltage appears across the transistor 178 and in the absence of a sharp control pulse, it will be normally conducting during each half-cycle. The base electrode of a second transistor 180 in the flip-flop circuit 177 is connected through a diode 181 to the collector electrode of the transistor 178 and, when the transistor 178 is conducting, the base of the second transistor 180 is essentially at ground potential which prevents it from conducting. However, in the presence of a sharp control pulse on the base electrode of the transistor 178, which will be at the beginning of a half-cycle, the transistor 178 is held non-conducting long enough for the voltage applied across the diode 181 to break it down and allow current to flow through the resistor 179, the diode 181, and a resistor 182. This causes the transistor 180 to be biased to conduction so that current flows from the conductor 168, the transistor 180, through the relay winding 175 and to the conductor 169. Since the collector electrode of the transistor 180 is coupled back to the base electrode of the transistor 178, current flowing through the transistor 180 will pull the base electrode of the transistor 178 to essentially ground potential and prevent this transistor from conducting during that half-cycle. Current then continues to flow through the transistor 180 and the relay winding 175 for the remainder of the half-cycle and reverse the position of the switch 172 for as long as the sharp pulses continue.

It can be seen that when the circuits illustrated in FIGURES 6, 8 and 9 are being used to control the operation of a model railroad, the radio frequency source that generates the sharp pulses can be used to determine the direction of travel of the locomotive and the radio frequency source that generates the variable width pulses can be used to regulate the speed of the locomotive.

Figure 10:
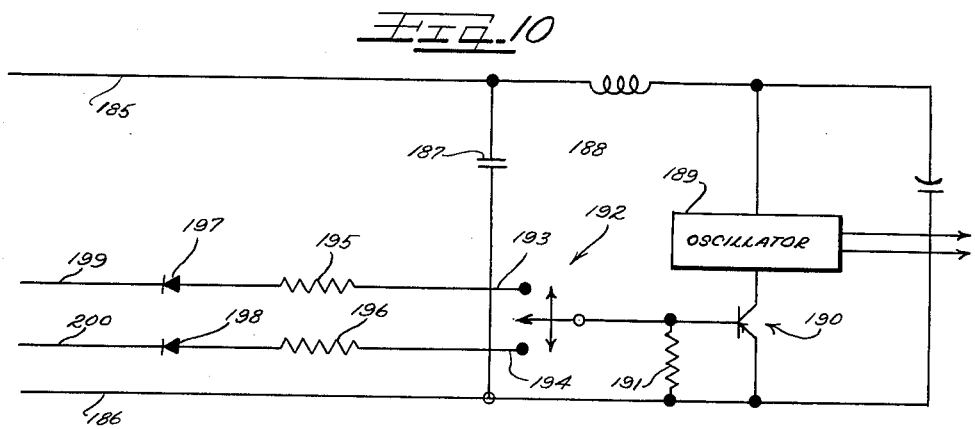
FIGURE 10 is a schematic illustration of a radio frequency signal source constructed in accordance with another embodiment of the invention.
Figure 11:
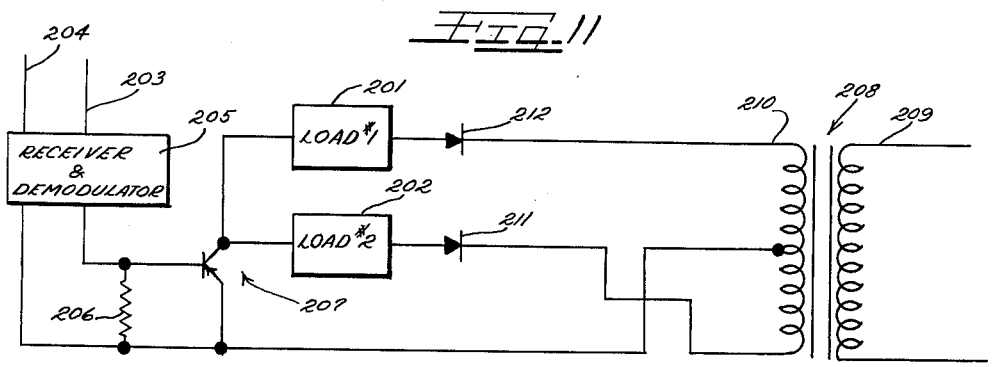
FIGURE 11 is a schematic illustration of a radio frequency signal receiver for the source shown in FIGURE 10.

FIGURES 10 and 11 illustrate still another embodiment of the invention. The control system illustrated in these two figures can control two loads by turning them either on or off.

With reference to FIGURE 10, a full wave rectified voltage is applied across two conductors 185 and 186 and is filtered by a capacitor 187 and coil 188. An oscillator 189 and a transistor 190 are connected in series across this filtered voltage. The base electrode of the transistor 190 is connected through a resistor 191 to the conductor 186 and also to a two-position switch 192. The two positions 193 and 194 of the switch 192 are connected to two resistors 195 and 196 and to two diodes 197 and 198. The conductors 199 and 200 are connected to a voltage that is alternating relative to the zero potential line 186.

Since the transistor 190 is a PNP type it will conduct only when its base electrode is more negative than its emitter electrode. When the switch 192 is at position 193, the base electrode will be more negative than the emitter electrode and the conductor 186 during alternate half cycles. Accordingly, the transistor 190 will conduct during these alternate half-cycles and cause the oscillator 189 to generate radio frequency signals. When the switch is connected to position 194, the base electrode of the transistor 190 will again be more negative than its emitter electrode during alernate half-cycles but during opposite half-cycles than when the switch 192 is at position 193.

The circuit illustrated in FIGURE 11 is designed to be responsive to the signals generated by the oscillator 189 in FIGURE 10 and to control two loads 201 and 202. Two conductors 203 and 204 connect the transmission line (not shown) to a receiver-demodulator circuit 205. Across the output of this circuit is connected a resistor 206 and the base and emitter electrodes of a transistor 207. The collector electrode of this transistor 207 is connected to the loads 201 and 202. A transformer 208 has its primary winding 209 connected to the transmission line, which also carries an A.-C. voltage, and its secondary winding 210 connected to two diodes 211 and 212. A center tap 213 on the winding 210 is connected to the emitter electrode of the transistor 207.

In operation, the radio frequency signals generated by the oscillator 189 are picked up by the receiver-demodulator circuit 205. If the switch 192 in FIGURE 10 is at position 193 the oscillator 189 will generate signals at the same time that the conductor connected to the first load 201 is going positive. When these two conditions occur simultaneously, the transistor 207 conducts and current flows through the load 201 during alternate half-cycles. If it is desired to energize the load 202, the switch 192 is set to position 194 which causes the oscillator 189 to generate radio frequency signals at the opposite half-cycles. These signals appear on the base electrode of the transistor 207 at the same time that the conductor connected to the second load 202 is going positive which causes current to flow through the second load during alternate half-cycles. It can be seen that the two loads can be selectively energized simply by operating the switch 192 in FIGURE 10.

While various means of modulating the radio frequency waves have been described and illustrated, it will be apparent that still others can be used. For example, a variable pulse position system can be used in which the point of occurrence of a pulse is varied in time in such a manner as to control a load. In this case, of course, a receiver will also have to be provided which will be responsive to this type of modulation. Also, combinations of the embodiments described herein can be used in a single control system by providing a switch that will connect one of the embodiments to the transmission line at a time, since in most cases the embodiments cannot be used concurrently.

It will be apparent that many modifications and variations may be effected without departing from the scope of the novel concepts of the present invention.

I claim as my invention:

1. A system for controlling the operation of a plurality of loads that receive power frequency electrical energy from a common transmission line comprising an electrical power supply at least one signal generator connected to said power supply and adapted to be connected to the transmission line, said generator being adapted to generate signals at a predetermined radio frequency, manually variable operable means having an on position and an off position connected to said generator for decreasing the magnitude of the voltage applied to said generator from said power supply when said variable means is turned off, automatic means connected to said generator for gradually decreasing the magnitude of the voltage applied to said generator when said variable means is turned off, at least a first radio frequency signal receiver adapted to be connected to the transmission line, said first receiver being responsive only to the signals generated by said first generator, the output of said first receiver being connected to vary the current flow from the transmission line to a load in accordance with variations in the amplitude of the signals generated by said first generator.

2. A system for controlling the operation of a plurality of loads that receive power frequency electrical energy from a transmission line comprising at least a first radio frequency signal generator adapted to be connected to the transmission line, said first generator being designed to generate signals at a predetermined radio frequency, a power supply connected to supply an energizing voltage to said first generator, manually variable means for varying the magnitude of the voltage applied to said first generator by said power supply in order to vary the amplitude of the signal generated by said generator, circuit means for applying a gradually decreasing voltage to said first generator when said variable means decreases the voltage applied to said generator, said circuit means comprising a capacitor connected to be charged when said variable means applies an energizing voltage to said first generator, and transistor means connected to be biased to conduction by the charge on said capacitor after the voltage applied by said variable means has been decreased, the current flowing through said transistor when it is conducting being connected to flow through said generator and energize said generator, and a discharge path connected across said capacitor, at least a first radio frequency signal receiver adapted to be connected to the transmission line, said first receiver being responsive to the signals generated by said first generator, said first received being connected to vary the flow of current from the transmission line to a load in accordance with variations in the amplitude of the signals generated by said first generator.

References Cited by the Examiner

UNITED STATES PATENTS

| | | | |
|---|---|---|---|
| 1,786,815 | 12/30 | Aspinwall | 104—149 |
| 2,073,443 | 3/37 | Cardoza | 104—149 |
| 2,285,684 | 6/42 | Seeley | 340—147 |
| 2,400,260 | 5/46 | Miller | 340—163 |
| 2,515,254 | 7/50 | Nosker | 340—147 |
| 2,521,240 | 9/50 | Milne | 246—4 X |
| 2,589,998 | 3/52 | Dougherty | 104—149 |
| 2,622,542 | 12/52 | Bonanno | 104—50 |
| 2,643,369 | 6/53 | Marley et al. | |
| 2,677,122 | 4/54 | Gardner | 340—147 |
| 2,688,933 | 9/54 | Spafford | 104—88 |
| 2,743,678 | 5/56 | Hibbard | 104—151 |
| 3,087,440 | 4/63 | Zarnstorff | 104—152 |

EUGENE G. BOTZ, *Primary Examiner.*

LEO QUACKENBUSH, ARTHUR L. LA POINT,
*Examiners.*